June 3, 1930.   C. W. MANZEL   1,761,891
LUBRICATING SYSTEM
Filed April 14, 1925
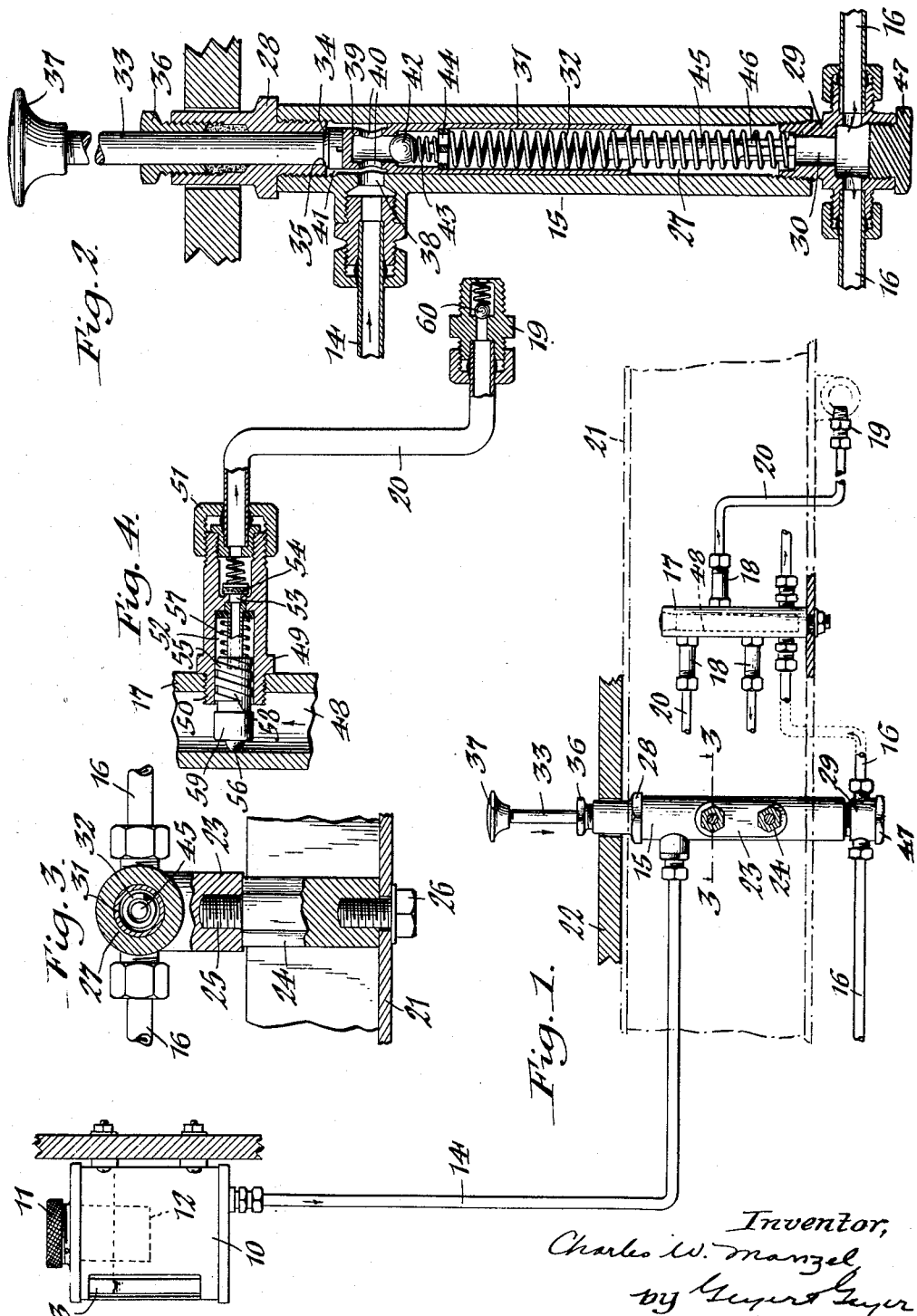
Inventor,
Charles W. Manzel
by Geyer & Geyer
Attorneys.

Patented June 3, 1930

1,761,891

UNITED STATES PATENT OFFICE

CHARLES W. MANZEL, OF BUFFALO, NEW YORK

LUBRICATING SYSTEM

Application filed April 14, 1925. Serial No. 22,999.

This invention relates generally to the art of lubrication, but more particularly to a lubricating system for motor-driven vehicles.

One of its objects is to provide a simple and reliable pump combined with a plurality of measuring units or valves for effectually controlling the delivery of a predetermined amount of lubricant to the bearings of the vehicle.

Another object of the invention is to so organize and arrange the various parts of the system that a solid column of lubricant is in the pipe lines and other parts of the system at all times, whereby the apparatus is always ready for use without requiring repriming to insure a thorough lubrication of the bearings.

In the accompanying drawings:—Figure 1 is a side elevation of my improved lubricating system as applied to an automobile. Figure 2 is an enlarged vertical longitudinal section of the operating pump of the system. Figure 3 is a horizontal section on line 3—3, Fig. 1. Figure 4 is a detailed sectional view of one of the measuring units or valves and associated parts.

Similar characters of reference indicate corresponding parts throughout the several views.

In the preferred embodiment of the invention shown in the drawings, the same comprises an oil reservoir 10 suitably fastened to the automobile-body beneath the hood and having a filling cap 11 applied to its top. Extending into the reservoir opposite its filling-opening is a filter screen 12, and preferably located at one corner of said reservoir where it can be easily seen is a gauge glass 13. From this reservoir, the oil is fed by gravity through a pipe 14 into a foot-operated pressure pump 15 whose outlet end communicates through pipes or tubes 16 with one or more manifolds 17 located at convenient points on the car-chassis and containing a plurality of measuring units or valves 18 which control the amount of oil delivered to the bearings through valved-fittings 19 applied directly to the bearing-points and connected with the respective measuring valves by pipes 20.

The pump 15 is supported in a substantially upright position on the vehicle-frame 21 below the floor-board 22 and for this purpose is provided at one side with a boss or projection 23 to which upper and lower spacing members 24 are detachably connected, as by screw studs 25, said spacing members being fastened to the vehicle-frame by bolts 26 or similar fastenings. The pump consists of a barrel or cylinder 27 having its ends internally-threaded to receive upper and lower screw plugs or caps 28, 29, respectively, the lower plug containing an outlet passage 30 to which the pipes 16, communicating with the manifolds 17, are connected. Operating in the cylinder is a chambered or hollow piston 31 normally held in its elevated position by a spring 32, while a plunger-rod 33 extending through the upper cylinder-plug 28 above the floor board and abutting at its lower end against the upper end of the plunger serves to force the latter downwardly in its cylinder to discharge the oil therefrom under pressure. The lower end of the plunger-rod has an upwardly-facing shoulder 34 which normally engages a beveled seat 35 on the opposing end of the screw plug 28. A packing nut 36 prevents leakage of the lubricant into the car-body and a foot-engaging knob 37 is applied to the upper end of the plunger-rod for conveniently actuating it from the driver's seat. Near its upper end the pump-cylinder has an oil-inlet passage 38 to which the outlet end of the pipe 14 leading from the reservoir is connected. The plunger terminates at its upper end in a reduced head 39 containing oil inlet ports 40 and forming an annular space or chamber 41 in the upper end of the cylinder 27 into which the inlet passage 38 opens. A downwardly-opening check-valve 42 controls the admission of oil into the plunger-bore and cylinder, a spring 43 bearing at its upper end against the valve and at its lower end against a by-passed plug 44 serving to normally hold said valve closed. On the down or operating stroke of the plunger, the valve 42 remains closed and the oil contained in the cylinder is forced under pressure through its outlet passage 30 to the pipes 16 leading to the manifolds 17 and thence through the measuring valves 18 and valved fittings 19 to the respective bearings to be lubricated.

The hollow construction of the piston 31 not only increases the pump capacity but also forms a cage or housing for receiving the upper portion of the spring 32. The lower portion of the latter is guided on a suitable stem 45 rising from the plug 29 and having longitudinal oil-conducting grooves 46 at its lower end. A removable screw cap 47 may be provided in the lower end of the plug 29.

As before stated, two or more pipes 16 conduct the oil from the pump outlet to manifolds 17 located at convenient points at the front and rear ends of the vehicle to accommodate a plurality of bearings. One of these manifolds, by way of example, is shown in Fig. 1, wherein the same is bolted to the vehicle frame 21 and contains an oil-receiving chamber or channel 48 with which the pipe 16 communicates. The measuring units or valves 18 are mounted on this manifold and communicate with its oil chamber, so that in response to the given impulse of the pump-plunger, the oil is forced under pressure to the different manifolds, which results in a predetermined quantity of oil being delivered to the respective bearings through their valved-fittings 19.

Each of the measuring valves, which are shown and described in my copending application filed April 6th, 1925, Serial No. 20,884, consists of a nipple or fitting 49 having a threaded neck 50 at one end for fastening it to the manifold and a clamping nut 51 at its opposite end for fastening the respective pipe 20 thereto. Extending lengthwise of the nipple and opening into the manifold chamber 48 is a cylinder 52 and connecting the latter with the outlet end of the nipple is an outlet port 53 controlled by a spring-pressed check-valve 54. Operable in the cylinder is a hollow piston-valve 55 whose closed rear or inner end projects across the chamber 48 and may be provided with a boss 56 for holding the same a sufficient distance from the chamber-wall to permit the oil under pressure to act on the piston-valve and move it forwardly in its cylinder. The piston-valve is normally held against the wall of the oil chamber by a spring 57 and is provided in its exterior face with a spiral oil-conducting groove 58 extending from its open front end to a point short of its rear portion or head 59 which is ungrooved and serves to close off said groove and prevent the admission of oil to the cylinder shortly after the piston-valve starts its forward movement to expel the lubricant from the cylinder into the bearing connected therewith. Said hollow piston-valve and that portion of the cylinder in front of the latter together constitute a measuring chamber which holds a predetermined quantity of oil to be delivered to the bearing at a given impulse of the pump. On the return or backward stroke of the piston-valve, a vacuum is created in the measuring chamber and the oil is drawn into the same through said spiral groove 58, which in the normal position of the valve shown in Fig. 4, opens into the manifold chamber 48.

The fitting 19, which is mounted directly on the bearing and connected with the outlet end of the measuring valve by the pipe 20, contains a spring-pressed check-valve 60 which normally retains the oil in the pipe and normally prevents leakage at the bearing.

The operation of this lubricating system is as follows:—

After filling the reservoir 10 with oil, the pump-plunger is forced downwardly one or more times by stepping on the foot-engaging knob 37. This results in the filling and priming of the various pipe lines and valves solid with oil, so that a complete column of oil, free from air-pockets, extends from one end of the system to the other, and the apparatus is ready for use. When it is desired to give the bearings a "shot" of oil, the pump plunger is simply forced downwardly, this one operation resulting in a predetermined amount of oil being delivered to each and every bearing included in the system. The pressure on the oil thus created forces the corresponding piston-valves 55 forwardly in their cylinder simultaneously with the down-stroke of the pump-plunger, thereby expelling the oil from the chambers of the measuring valves through the pipes 20 and valved fittings 19 into the respective bearings. Simultaneously with the return of the pump plunger 31 to its normally elevated position, the piston-valves 55 are returned to their initial retracted position, which results in the refilling of the pump cylinder and also the chambers of the measuring valves. On the return stroke of the piston-valves, the oil is sucked or drawn through their spiral grooves 58 into the respective measuring chambers, the amount of oil admitted being substantially the same as that previously expelled.

In practice, the measuring valve chambers are of a size to deliver, say, from 6 to 8 drops of oil at given impulse of the pump-plunger, and the capacity of the pump-cylinder is approximately $\frac{1}{4}$ per cent greater than that of the combined capacities of the measuring valves.

It will be noted, that the outlet end of the pump is valveless, the flow of the oil through the system being controlled by the valves 54 and 60 applied to the measuring valves 18 and fittings 19, respectively. This arrangement insures a solid column of oil in the pipe lines at all times.

I claim as my invention:—

A lubricating system for automobile bearings and the like, comprising a reservoir for the lubricant, a plunger-pump including an inlet and an outlet, said inlet being connected to the reservoir, a fitting applied to the bearing to be lubricated and containing a check-valve, a conduit connecting the pump-outlet with said valve-fitting, and a measuring device interposed in said conduit for delivering a predetermined quantity of lubricant to the bearing, said device including a measuring chamber having a valve-controlled outlet port at its discharge end, and a piston-valve operable in the inlet end of said chamber and exposed at its rear end to the lubricant-pressure in the conduit, said piston-valve having a spiral oil-conducting groove in its exterior face for controlling the expulsion and admission of lubricant to and from the chamber in response to the forward and return movements of the piston valve effected by the corresponding movements of the pump-plunger.

CHARLES W. MANZEL.